US011448897B2

(12) United States Patent
Lee et al.

(10) Patent No.: US 11,448,897 B2
(45) Date of Patent: Sep. 20, 2022

(54) THREE-DIMENSIONAL IMAGING SYSTEM AND METHOD

(71) Applicant: Industrial Technology Research Institute, Hsinchu (TW)

(72) Inventors: Chien-Ju Lee, Taoyuan (TW); Shin-Hong Kuo, New Taipei (TW); Yu-Hsiang Liu, Chiayi (TW); Kuan-Ting Chen, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 63 days.

(21) Appl. No.: 16/917,919

(22) Filed: Jul. 1, 2020

(65) Prior Publication Data

US 2021/0006776 A1    Jan. 7, 2021

Related U.S. Application Data

(60) Provisional application No. 62/869,573, filed on Jul. 2, 2019.

(30) Foreign Application Priority Data

Jun. 24, 2020   (TW) ................... 109121476

(51) Int. Cl.
  *H04N 13/363*  (2018.01)
  *G02B 30/56*   (2020.01)
  *H04N 13/30*   (2018.01)
(52) U.S. Cl.
  CPC ........... *G02B 30/56* (2020.01); *H04N 13/363* (2018.05); *H04N 2013/405* (2018.05)
(58) Field of Classification Search
  CPC .... G02B 30/56; H04N 13/363; H04N 13/393; H04N 2013/405
  See application file for complete search history.

(56) References Cited

U.S. PATENT DOCUMENTS 8,922,636 B1* 12/2014 Belden ................... G01P 5/001
                                                    348/77
9,223,192 B1* 12/2015 Linnell ............... G03B 21/608
(Continued)

FOREIGN PATENT DOCUMENTS

CN          101013302          8/2007
CN          109358471          2/2019
(Continued)

OTHER PUBLICATIONS

"Office Action of Taiwan Counterpart Application", dated Dec. 30, 2020, p. 1-p. 8.
(Continued)

*Primary Examiner* — Magda Cruz
(74) *Attorney, Agent, or Firm* — JCIPRNET

(57) ABSTRACT

A three-dimensional imaging system and method are provided. The three-dimensional imaging system includes a suspension force field generator, a projection module, and a controller. The suspension force field generator generates a suspension force field to suspend a plurality of scattering particles used for scattering incident light and distribute the scattering particles on a projection plane. The projection module projects an image on the projection plane. The controller is coupled to the suspension force field generator and the projection module, controls the suspension force field generator to change the suspension force field so that the projection plane where the scattering particles are distributed moves in a display space, extracts a slice plane image that matches a position of the projection plane from multiple slice plane images sliced from a three-dimensional stereoscopic image, and controls the projection module to project the extracted slice plane image to the projection plane.

15 Claims, 7 Drawing Sheets

(56) References Cited

U.S. PATENT DOCUMENTS

| | | | | |
|---|---|---|---|---|
| 9,716,878 B2 * | 7/2017 | Teller | ............... | H04N 13/393 |
| 2002/0130820 A1 * | 9/2002 | Sullivan | ............... | H04N 13/388 |
| | | | | 348/E13.058 |
| 2002/0135673 A1 | 9/2002 | Favalora et al. | | |
| 2007/0247595 A1 * | 10/2007 | Refai | ............... | G03B 21/26 |
| | | | | 353/94 |
| 2009/0179852 A1 * | 7/2009 | Refai | ............... | G09G 3/001 |
| | | | | 345/107 |
| 2010/0321478 A1 | 12/2010 | Sliwa et al. | | |
| 2017/0004819 A1 | 1/2017 | Ochiai et al. | | |
| 2017/0214909 A1 * | 7/2017 | Subrahmanyam et al. | ............... | |
| | | | | G02B 30/50 |
| 2020/0257126 A1 * | 8/2020 | Schmalenberg | .... | G06F 3/04815 |

FOREIGN PATENT DOCUMENTS

| | | |
|---|---|---|
| EP | 2541954 | 1/2013 |
| EP | 3432299 | 1/2019 |
| JP | 2009535665 | 10/2009 |
| TW | 540228 | 7/2003 |
| TW | I318719 | 12/2009 |
| TW | 201426010 | 7/2014 |
| TW | 201824858 | 7/2018 |

OTHER PUBLICATIONS

"Office Action of China Counterpart Application", dated Dec. 2, 2021, p. 1-p. 7.

* cited by examiner

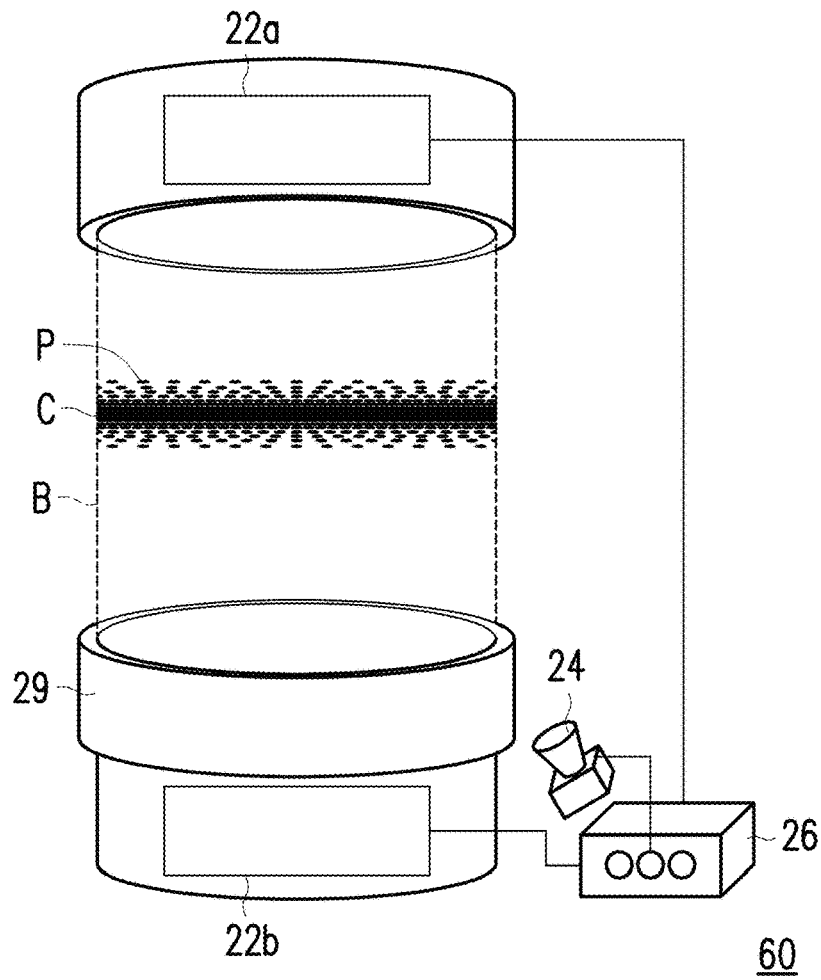

FIG. 6

| controlling a suspension force field generator to generate a suspension force field to suspend a plurality of scattering particles and distribute the scattering particles on a projection plane, wherein by changing the suspension force field, the projection plane where the scattering particles are distributed moves in a display space | ~S702 |

| extracting a slice plane image that matches a position of the projection plane from a plurality of slice plane images sliced from a three-dimensional stereoscopic image | ~S704 |

| controlling a projection device to project the extracted slice plane image to the projection plane | ~S706 |

THREE-DIMENSIONAL IMAGING SYSTEM AND METHOD

CROSS-REFERENCE TO RELATED APPLICATION

This application claims the priority benefits of U.S. provisional application Ser. No. 62/869,573, filed on Jul. 2, 2019, and Taiwan application serial no. 109121476, filed on Jun. 24, 2020. The entirety of each of the above-mentioned patent applications is hereby incorporated by reference herein and made a part of this specification.

BACKGROUND

Technical Field

The disclosure relates to a display device and method, and particularly relates to a three-dimensional imaging system and method.

Description of Related Art

The three-dimensional imaging technology is adopted to present a stereoscopic image of an object in a three-dimensional space, so that a user may enjoy a vivid stereoscopic visual experience. The three-dimensional projection technology projects a three-dimensional image of an object on a two-dimensional plane through parallel projection and/or perspective projection. When such technology is applied, a plurality of projectors are required to be set up, and a position, an orientation, a field of view, and other configurations of each projector have to be associated with a display plane. In this way, the three-dimensional projection is achieved through projection transform. The holographic projection technology is a virtual imaging technology used for reproducing a three-dimensional image of an object. The holographic technology records information of the object in various angles by using light interference and diffraction principles and projects light to a transparent film or a lens with a special material to form the three-dimensional image.

However, both of the above three-dimensional projection and holographic projection are achieved through projection of light, and the projected images are limited to the 2D plane. As such, the viewing angle of the user is limited, and multi-person multi-angle viewing may not be achieved.

SUMMARY

The disclosure is related to a three-dimensional imaging system including a suspension force field generator, a projection module, and a controller. The suspension force field generator is configured to generate a suspension force field to suspend a plurality of scattering particles used for scattering incident light and distribute the scattering particles on a projection plane. The projection module is configured to project an image on the projection plane. The controller is coupled to the suspension force field generator and the projection module, is configured to control the suspension force field generator to change the suspension force field so that the projection plane where the scattering particles are distributed moves in a display space, extracts a slice plane image that matches a position of the projection plane from a plurality of slice plane images sliced from a three-dimensional stereoscopic image, and controls the projection module to project the extracted slice plane image to the projection plane.

The disclosure is related to a three-dimensional imaging method adapted to a three-dimensional imaging system including a suspension force field generator, a projection device, and a controller. The method includes the following steps. The suspension force field generator is controlled to generate a suspension force field to suspend a plurality of scattering particles and distribute the scattering particles on a projection plane, and by changing the suspension force field, the projection plane where the scattering particles are distributed moves in a display space. A slice plane image that matches a position of the projection plane is extracted from a plurality of slice plane images sliced from a three-dimensional stereoscopic image. The projection device is controlled to project the extracted slice plane image to the projection plane.

To make the aforementioned more comprehensible, several embodiments accompanied with drawings are described in detail as follows.

BRIEF DESCRIPTION OF THE DRAWINGS

FIG. 6 is a schematic diagram of a three-dimensional imaging system according to an embodiment of the disclosure.

FIG. 7 is a flow chart illustrating a three-dimensional imaging method according to an embodiment of the disclosure.

DESCRIPTION OF THE EMBODIMENTS

An embodiment of the disclosure provides a three-dimensional (three-dimensional) imaging system that treats scattering particles capable of scattering incident light as a display medium and uses a suspension control technique to generate a sound field, a magnetic field, or other controllable over-range force fields around the scattering particles, so as to control the scattering particles to scan back and forth in a display space to form high-speed moving projection planes. Further, slice plane images of a three-dimensional object are accurately projected on the scanning projection planes, so that human eyes may view a stereoscopic image through a visual persistence effect.

Figure 1:
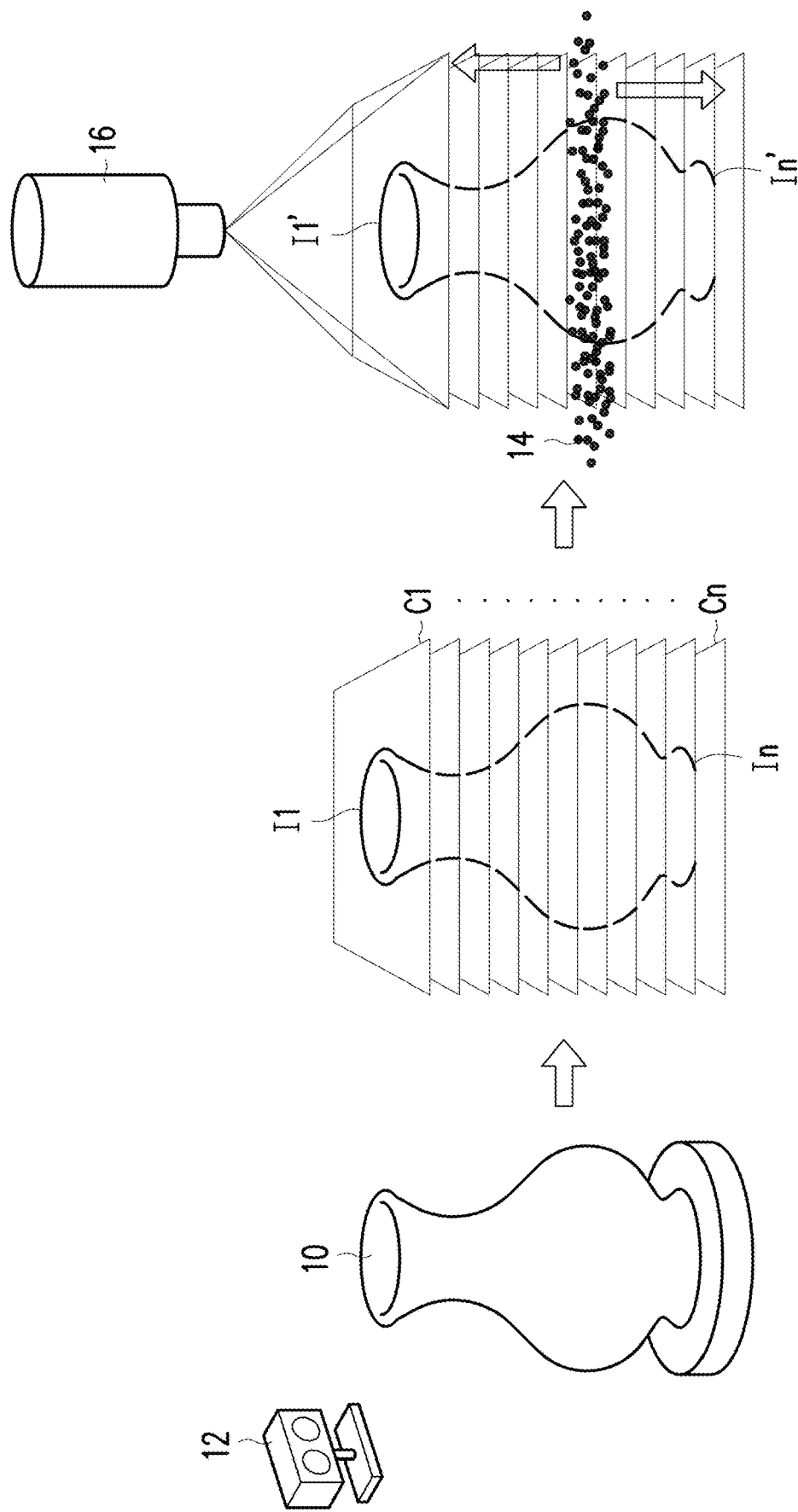
FIG. 1 is a schematic diagram of a three-dimensional (three-dimensional) imaging technique according to an embodiment of the disclosure.

FIG. 1 is a schematic diagram of a three-dimensional imaging technique according to an embodiment of the disclosure. Referring to FIG. 1, in the embodiment, an image capturing device 12 is used to scan an object 10 to perform three-dimensional modeling. The image capturing device 12 is, for example, a camera, a video camera, an infrared sensor, a laser sensor, etc., which is not limited by the disclosure. In an embodiment, holography may be used to record information such as amplitudes or phases of light waves reflected or transmitted by the object 10, so as to reconstruct a three-dimensional graphic data image of the object 1 in different orientations and angles. After obtaining the three-dimensional graphic data image, a two-dimensional (2D) slice plane image processing is performed on the three-dimensional graphic data image of the object 10, for example, the three-dimensional graphic data image is sliced into slice plane images I1-In according to positions of slice planes C1-CN, where n is a positive integer. During an imaging process, a suspension force field is generated around scattering particles 14 to control the scattering particles 14 to scan back and forth in the display space to form high-speed moving projection planes, and meanwhile, a projection device 16 is used to accurately project the slice plane images I1-In on each projection plane to form projection images I1'-In'. In this way, the human eyes may view a three-dimensional stereoscopic image of the object 10 through a visual persistence effect on the projection images I1'-In'.

Figure 2:
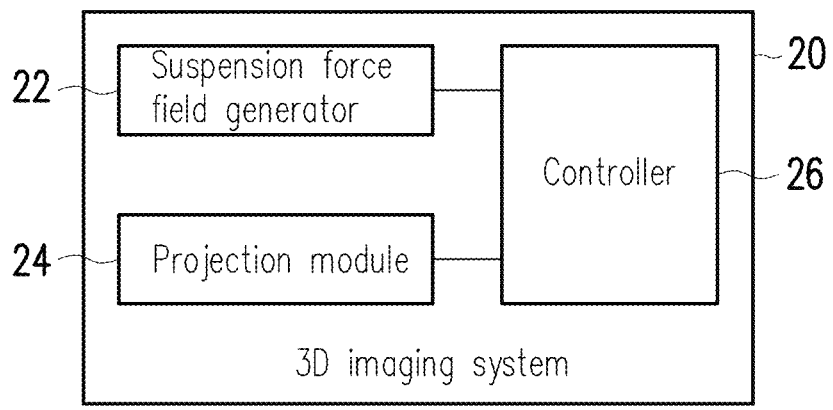
FIG. 2 is a block diagram of a three-dimensional imaging system according to an embodiment of the disclosure.

FIG. 2 is a block diagram of a three-dimensional imaging system according to an embodiment of the disclosure. Referring to FIG. 2, the three-dimensional imaging system 20 of the embodiment includes a suspension force field generator 22, a projection module 24, and a controller 26, and functions thereof are provided as follows.

The suspension force field generator 22 is, for example, a speaker capable of producing a sound field, a permanent magnet capable of producing a magnetic field, an electromagnet capable of producing an electromagnetic field, or a device capable of producing other controllable over-range forces, which is not limited by the disclosure.

In some embodiments, the suspension force field generator 22 may be selectively used together with a reflection device to generate or enhance an effect of the suspension force field generated by the suspension force field generator 22. The reflection device is, for example, configured relative to the suspension force field generator 22 and is used to reflect the suspension force field generated by the suspension force field generator 22, so that the scattering particles are suspended and distributed on the projection plane between the suspension force field generator 22 and the reflection device. For example, in an embodiment of using a speaker to produce a sound field, a reflection plane may be arranged on another side of the scattering particles relative to one side of the scattering particles where the speaker is located, so that the reflection plane may reflect the sound field produced by the speaker to form a standing wave between the speaker and the reflection plane, and the scattering particles are moved to a plane where a standing wave node is located to form the projection plane.

In some embodiments, the suspension force field generator 22 may be arranged on two sides of the scattering particles to form the suspension force field. For example, in an embodiment of using electromagnets to produce a magnetic field, the electromagnets may be disposed on both sides of the scattering particles, and the two electromagnets are controlled to produce magnetic fields of a same polarity, so as to control the scattering particles between the two electromagnets, and a position of the scattering particles may be changed by adjusting intensities of the magnetic fields generated by the individual electromagnets.

Figure 3A:
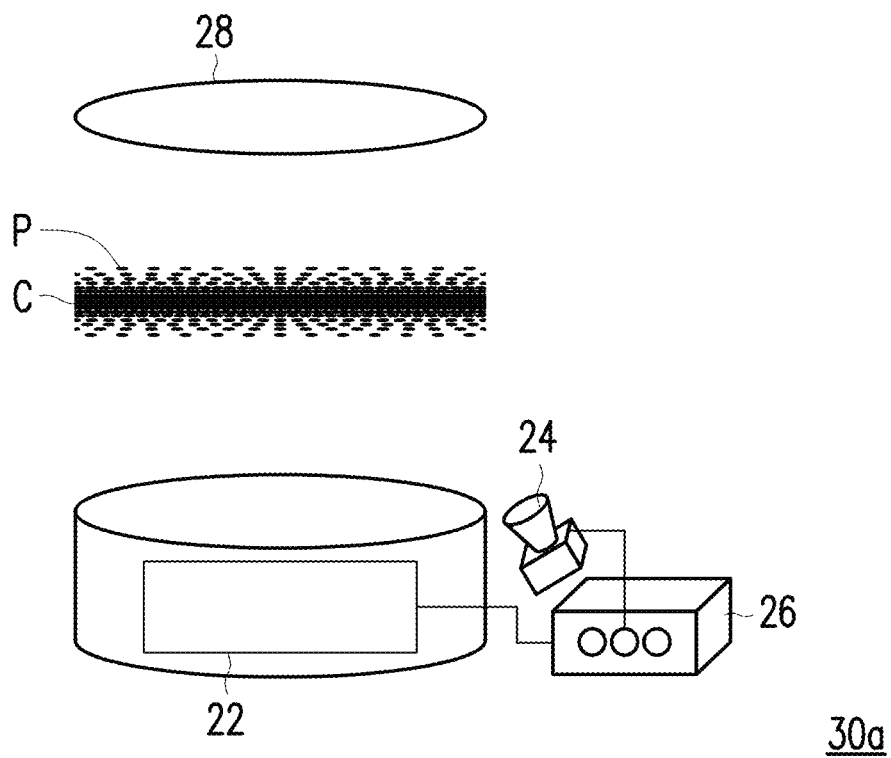
FIG. 3A and FIG. 3B are schematic diagrams of a three-dimensional imaging system according to an embodiment of the disclosure.
Figure 3B:
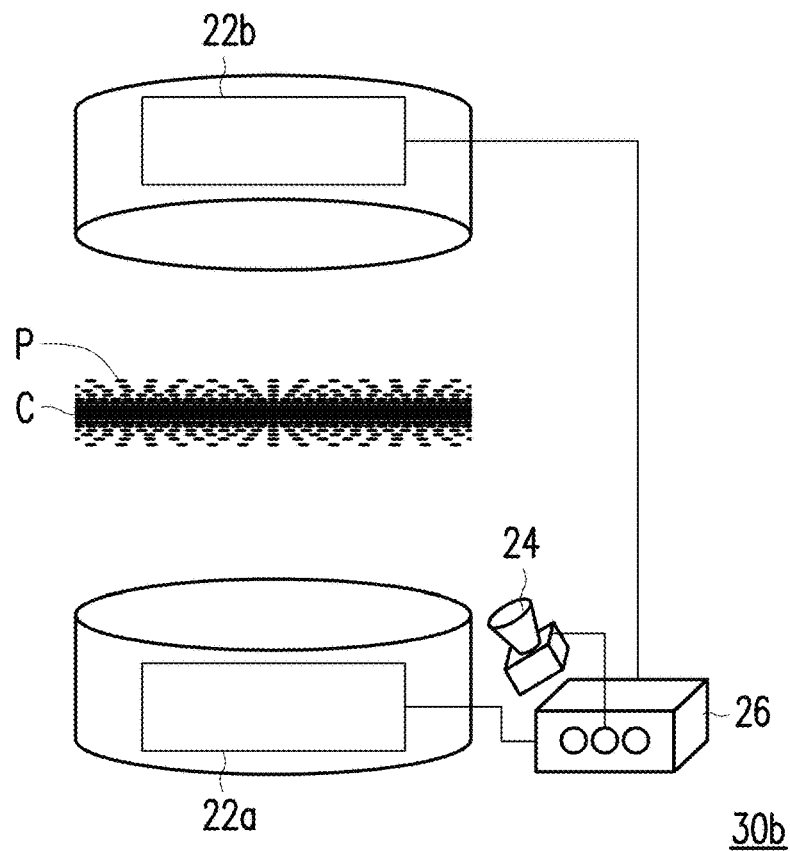

For example, FIG. 3A and FIG. 3B are schematic diagrams of a three-dimensional imaging system according to an embodiment of the disclosure. Referring to FIG. 3A, a three-dimensional imaging system 30a includes the suspension force field generator 22, the projection module 24 and the controller 26. In the three-dimensional imaging system 30a, a reflection device 28 may be arranged on another side of the scattering particles P relative to one side of the scattering particles P where the suspension force field generator 22 is located to reflect the suspension force field generated by the suspension force field generator 22, so that the scattering particles P are suspended and distributed on a projection plane C between the suspension force field generator 22 and the reflection device 28. Referring to FIG. 3B, a three-dimensional imaging system 30b includes suspension force field generators 22a and 22b disposed on both sides of the scattering particles P, the projection module 24, and the controller 26, and is configured to form a suspension force field between the suspension force field generators 22a and 22b, so that the scattering particles P are suspended and distributed on the projection plane C between the suspension force field generators 22a and 22b.

In some embodiments, the three-dimensional imaging system 20 further includes a particle generator (not shown), which may generate one of or a combination of organic material particles, inorganic material particles, water molecules, magnetic particles, charged particles, plastic particles, and polymer material particles with the same or different polarities to serve as the aforementioned scattering particles. Where, in case that the scattering particles of the same polarity are generated, the particles repel each other, and in collaboration with the suspension force field of the same polarity, the scattering particles may be further evenly distributed in the display space. For example, in the case of using the charged particles as the scattering particles, by using the charged particles of the same polarity and an electromagnet capable of producing an electromagnetic field of the same polarity, it helps stabilizing the electromagnetic field to achieve an effect of uniformly distributing the charged particles in a suspension space of the electromagnetic field.

For example, in the three-dimensional imaging system 30b shown in FIG. 3B, when the scattering particles are the charged particles, if the suspension force field generators 22a and 22b generate electromagnetic fields with the same polarity as the polarity of the charged particles, since the electromagnetic fields on the upper and lower ends have the same polarity as that of the charged particles, a moving distance of the charged particles in a vertical direction (i.e. a Z-axis direction) is further limited, and the power for generating the suspension force field may be reduced to improve performance. In addition, since the charged particles with the same polarity repel each other, the particles are not easy to gather to gain weight to cause a problem of slow motion or dropping, and vibration between the particles may be increased, so as to increase the effect that the scattering particles are evenly distributed in the plane, and improve the image quality of three-dimensional imaging.

In some embodiments, the sound field applied to the scattering particles may be modeled according to characteristics of the speaker, a size and a material of the suspended particles, and a size, a shape, and an air resistance of the display space, so as to simulate a sound pressure distribution of the sound field generated by the speaker under different parameters (such as voltage) to serve as a reference for controlling the sound field to move the scattering particles.

Figure 4A:
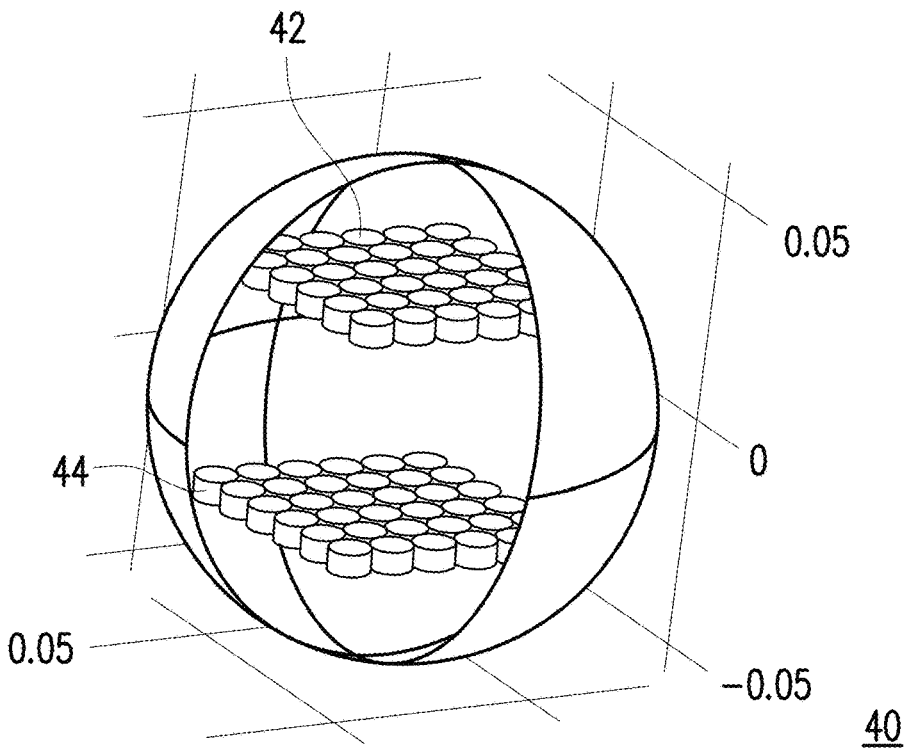
FIG. 4A is a diagram illustrating a configuration of a speaker according to an embodiment of the disclosure.
Figure 4B:
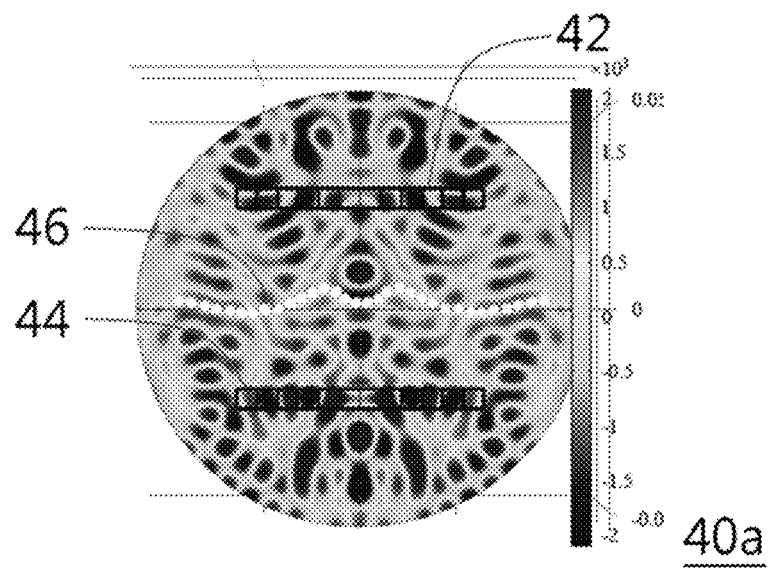
FIG. 4B and FIG. 4C are respectively a side view and a top view of a sound pressure distribution according to an embodiment of the disclosure.
Figure 4C:
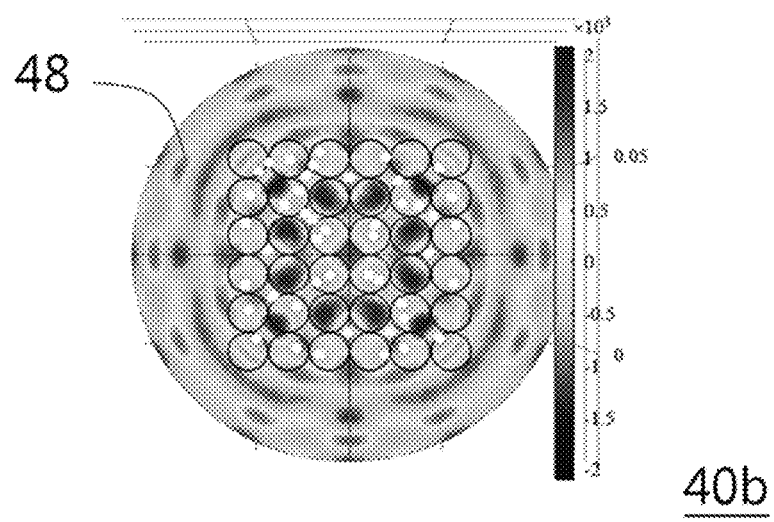

FIG. 4A is a diagram illustrating a configuration of a speaker according to an embodiment of the disclosure, and FIG. 4B and FIG. 4C are respectively a side view and a top view of a sound pressure distribution according to an embodiment of the disclosure. Referring to FIG. 4A, the three-dimensional imaging system 40 includes two speaker arrays 42 and 44 that are separated from each other by, for example, 15 cm, and each of the speaker arrays 42 and 44 may include, for example, 6×6 speakers. According to a size of a space between the speaker arrays 42 and 44, the parameters of the speakers may be adjusted to generate a sound field plane between the speaker arrays 42 and 44 and generate a high-pressure sound field on the periphery of the speaker arrays 42 and 44 to prevent overflowing of the suspended particles. From a side view 40a of a simulated sound pressure distribution shown in FIG. 4B, it is learned that a sound field plane 46 is formed between the speaker arrays 42 and 44. From a top view 40b of the simulated sound pressure distribution shown in FIG. 4C, it is learned that a high-pressure sound field 48 is formed at the periphery of the speaker arrays 42 and 44 to prevent overflowing of the suspended particles.

The projection module 24 is, for example, a device that may project images in space, such as a projector or a laser, etc. In some embodiments, the projection module 24 includes at least one projection device disposed around or in the center of the suspension force field generator 22, or disposed on another side of the scattering particles P relative to one side of the scattering particles P where the suspension force field generator 22 is located. The projection devices may project or respectively project images of at least one color to the projection plane or to a plurality of fixed sections of the projection plane.

Figure 5A:
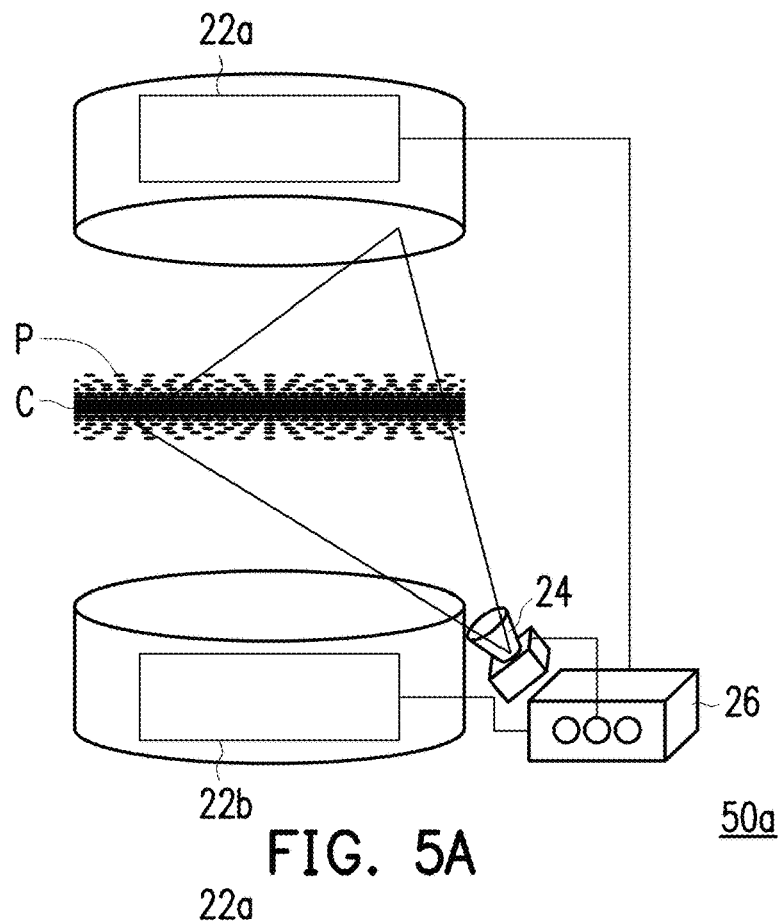
FIG. 5A and FIG. 5B are schematic diagrams of a three-dimensional imaging system according to an embodiment of the disclosure.
Figure 5B:
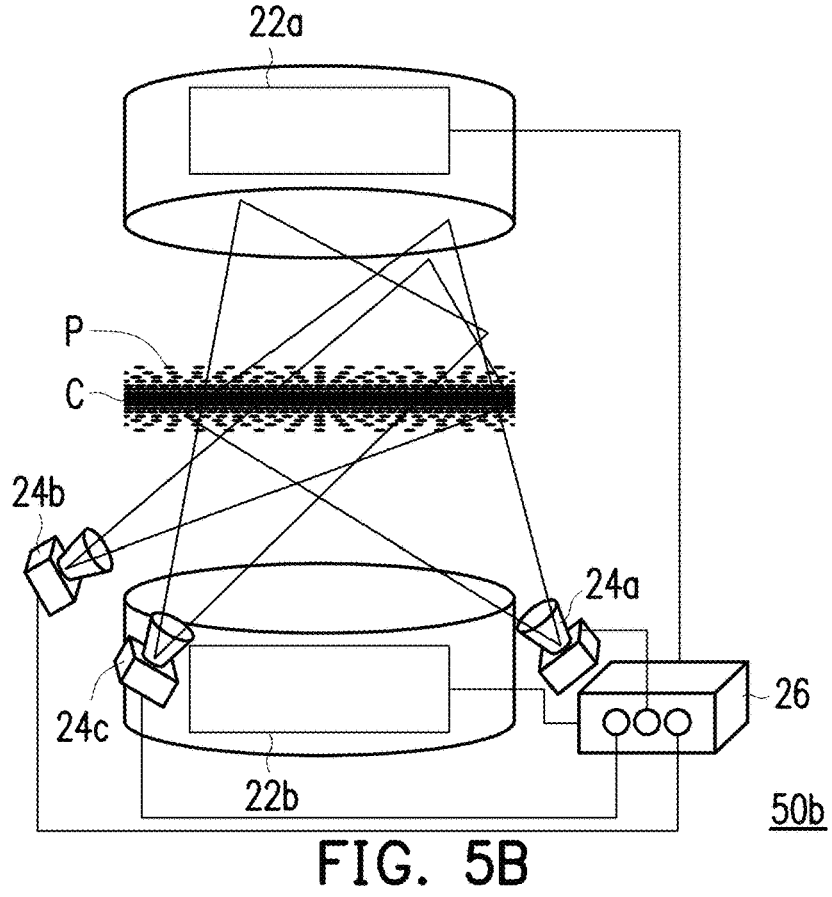

FIG. 5A and FIG. 5B are schematic diagrams of a three-dimensional imaging system according to an embodiment of the disclosure. Referring to FIG. 5A, a three-dimensional imaging system 50a includes the suspension force field generators 22a and 22b arranged on both sides of the scattering particles P, the projection module 24 arranged around the suspension force field generator 22b, and the controller 26. The controller 26 may control the projection module 24 to project a single color image or a color image on the projection plane C. Referring to FIG. 5B, a three-dimensional imaging system 50b includes the suspension force field generators 22a and 22b disposed on both sides of the scattering particles P, three projection devices 24a, 24b, 24c disposed around the suspension force field generator 22b, and the controller 26. The controller 26 may control the projection devices 24a, 24b, and 24c to respectively project red, green, and blue (R, G, and B) images on the projection plane C to form a color image on the projection plane C. In other embodiments, the controller 26 may control the projection devices 24a, 24b, and 24c to project images of different colors or intensities according to characteristics and positions of the projection devices 24a, 24b, and 24c, which is not limited by the disclosure.

In some embodiments, the three-dimensional imaging system 20 further includes a barrier generator (not shown), which may generate a barrier around the display space to limit the scattering particles to move within the display space. The barrier is, for example, composed of a force field (such as a sound field, a magnetic field, and a gas field), or composed of a fluid or solid material (a transparent solid object such as glass, acrylic, etc.), which may restrict the scattering particles to move within the space of the barrier and suppress spread of the scattering particles.

For example, FIG. 6 is a schematic diagram of a three-dimensional imaging system according to an embodiment of the disclosure. Referring to FIG. 6, a three-dimensional imaging system 60 includes the suspension force field generators 22a and 22b arranged on both sides of the scattering particles P, the projection module 24 arranged around the suspension force field generator 22b, and the controller 26. Moreover, the three-dimensional imaging system 60 further includes a barrier generator 29 disposed around the suspension force field generator 22b, which may generate a barrier B around the display space between the suspension force field generators 22a and 22b to suppress the scattering particles from spreading outward from the display space.

The controller 26 is coupled to the suspension force field generator 22 and the projection module 24, and is, for example, a central processing unit (CPU), a microcontroller unit (MCU), and a microprocessor, a programmable controller, application specific integrated circuits (ASIC), a programmable logic controller (PLC) or other similar devices or combinations of the above devices, which may load and execute a computer program to execute the three-dimensional imaging method of the embodiment of the disclosure.

FIG. 7 is a flowchart illustrating a three-dimensional imaging method according to an embodiment of the disclosure. Referring to FIG. 2 and FIG. 7, the method of the embodiment is adapted to the above-mentioned three-dimensional imaging system 20. Detailed steps of the three-dimensional imaging method of the embodiment are described below with reference of the components of the three-dimensional imaging system 20.

In step S702, the controller 26 controls the suspension force field generator 22 to generate a suspension force field to suspend a plurality of scattering particles and distribute the scattering particles on a projection plane, and by changing the suspension force field, the projection plane where the scattering particles are distributed moves in a display space. The controller 26, for example, controls the suspension force field generator 22 to change the generated suspension force field such as a sound field or a magnetic field, etc., to push the scattering particles, so that the projection plane formed by the scattering particles moves in the display space.

Inn step S704, the controller 26 extracts a slice plane image that matches a position of the moved projection plane from a plurality of slice plane images sliced from a three-dimensional stereoscopic image. The three-dimensional stereoscopic image is, for example, a three-dimensional graphic data image obtained by performing scanning and three-dimensional modeling on the target object in advance or a three-dimensional stereoscopic image drawn through computer graphics, and the obtaining method and generation method of the three-dimensional stereoscopic image are not limited by the embodiment. In order to reconstruct the three-dimensional stereoscopic image of the object in the display space, the controller 26, for example, slices the three-dimensional stereoscopic image into a plurality of slice plane images at predetermined intervals, so that in the process of moving the projection plane (formed by the scattering particles), the controller 26 may extract the slice plane image of the corresponding position according to the position of the moved projection plane, and provide the same to the projection module 24 for projection.

In step S706, the controller 26 controls the projection module 24 to project the extracted slice plane image to the projection plane. In some embodiments, the controller 26 may control a single projection device, for example, control a focal plane or a focal depth, to project a single color image or a color image to the projection plane. In some embodiments, the controller 26 may control a plurality of projection devices to respectively project images of different colors to the projection plane, for example, to respectively project red, green, and blue images to form a color image. In some embodiments, the controller 26 may control a plurality of projection devices to respectively project a single color image or a color image to a plurality of fixed sections on the projection plane to form an integral image. The disclosure is not limited to the above projection method.

By using the above method, the three-dimensional imaging system 20 of the embodiment of the disclosure may provide a full-view stereoscopic image, and the generated stereoscopic image conforms to a real spatial dimension and may be viewed by multiple people together. In some embodiments, the three-dimensional imaging system 20 may be applied to different occasions as needed.

Figure 8A:
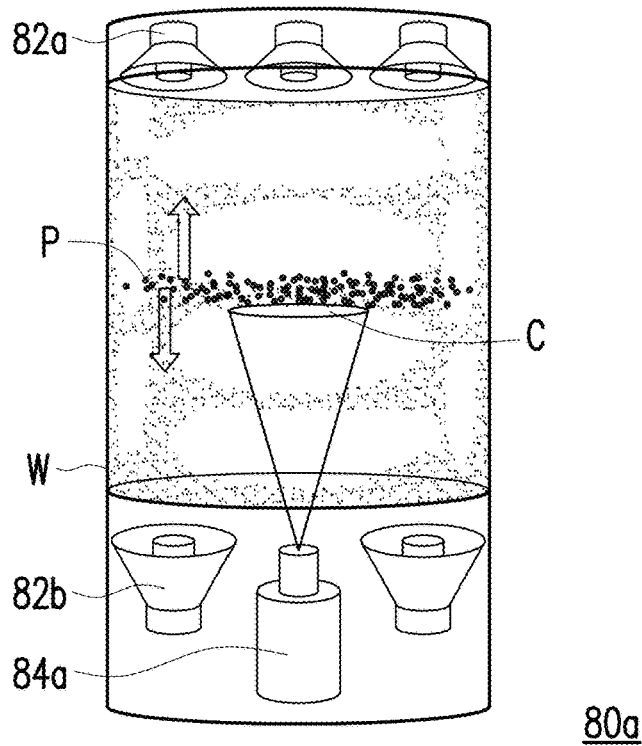
FIG. 8A and FIG. 8B are application examples of three-dimensional imaging systems according to an embodiment of the disclosure.
Figure 8B:
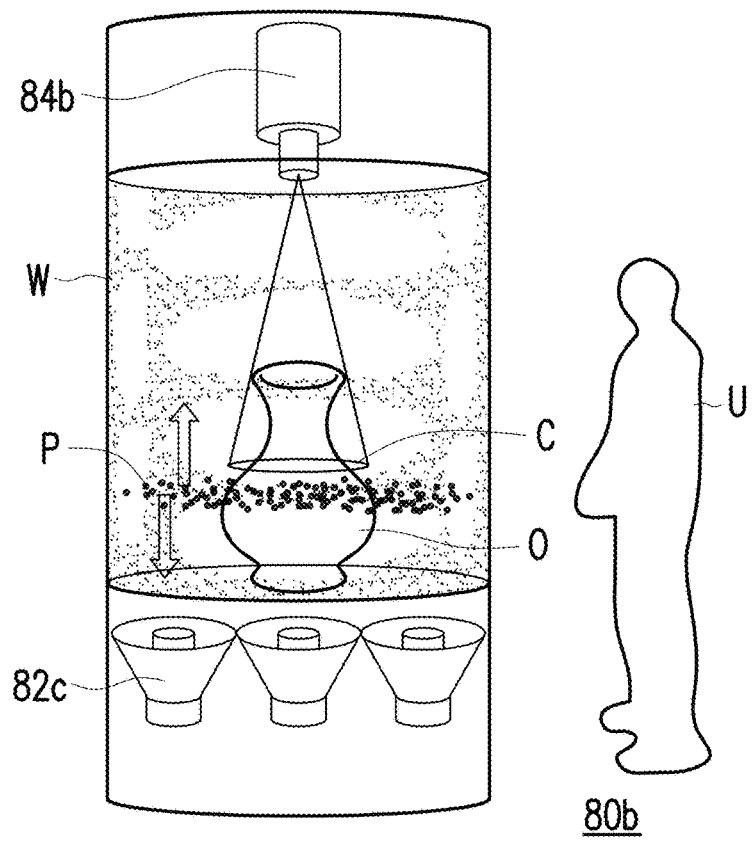

FIG. 8A and FIG. 8B are application examples of three-dimensional imaging systems according to an embodiment of the disclosure. Referring to FIG. 8A, a three-dimensional imaging system 80a may be composed of high-power sound wave generators 82a, 82b and a closed transparent tube wall W. By controlling a standing wave of a sound field generated by the sound wave generators 82a, 82b to scan in the vertical (Z-axis) direction, the scattering particles P are pushed to form a fast-moving projection plane C, and meanwhile a projection device 84a disposed at a lower center position is used to project the slice plane images at different positions in the vertical direction to the moving projection plane C, so as to generate the three-dimensional stereoscopic image of the object. The three-dimensional imaging system 80a may be used to, for example, project a three-dimensional portrait to serve as a personal assistant, or may project a three-dimensional object to serve as a subject to be discussed in a video call or a video conference.

Referring to FIG. 8B, a three-dimensional imaging system 80b may be composed of high-power sound wave generator 82c and a closed transparent tube wall W. By controlling a standing wave of a sound field generated by the sound wave generator 82c to scan in the vertical (Z-axis) direction, the scattering particles P are pushed to form the fast-moving projection plane C, and meanwhile a projection device 84b disposed at a upper center position is used to project the slice plane images at different positions in the vertical direction to the moving projection plane C, so as to generate the three-dimensional stereoscopic image of the object. The three-dimensional imaging system 80b may be used to, for example, project an exhibition item O for a user U to view.

In the three-dimensional imaging system and method of the embodiments of the disclosure, particles capable of scattering light are adopted to act as a projection medium, and the suspension force field is used to control the suspension and movement of the scattering particles to produce a fast-moving projection plane. In collaboration with the projection device to accurately project the slice plane images of the three-dimensional object to the moving projection plane, a viewer may view a full angle three-dimensional stereoscopic image conformed to a real space dimension based on the visual persistence effect.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A three-dimensional imaging system, comprising:
    a suspension force field generator, configured to generate a suspension force field to suspend a plurality of scattering particles and distribute the scattering particles on a projection plane, wherein the scattering particles scatter incident light of an image projected on the projection plane;
    a projection module, configured to project the image on the projection plane; and
    a controller, coupled to the suspension force field generator and the projection module and configured to:
        control the suspension force field generator to change the suspension force field, so that the projection plane where the scattering particles are distributed moves in a display space;
        extract a slice plane image that matches a position of the projection plane from a plurality of slice plane images sliced from a three-dimensional stereoscopic image according to positions of the slice plane images; and
        control the projection module to project the extracted slice plane image to the projection plane.

2. The three-dimensional imaging system according to claim 1, further comprising:
    a reflection device, arranged relative to the suspension force field generator, and reflecting the suspension force field generated by the suspension force field generator, so that the scattering particles are suspended and distributed on the projection plane between the suspension force field generator and the reflection device.

3. The three-dimensional imaging system according to claim 1, wherein the scattering particles comprise one of or a combination of organic material particles, inorganic material particles, water molecules, magnetic particles, charged particles, plastic particles, and polymer material particles with a same polarity or different polarities.

4. The three-dimensional imaging system according to claim 1, wherein the scattering particles have a same polarity.

5. The three-dimensional imaging system according to claim 1, wherein the projection module comprises at least one projection device disposed around or in a center of the suspension force field generator or disposed on another side of the scattering particles relative to one side of the scattering particles where the suspension force field generator is located.

6. The three-dimensional imaging system according to claim 5, wherein the at least one projection device comprises projecting or respectively projecting the image of at least one color to the projection plane or to a plurality of fixed sections of the projection plane.

7. The three-dimensional imaging system according to claim 1, wherein the suspension force field generator comprises a speaker used for producing a sound field, a permanent magnet used for producing a magnetic field, or an electromagnet used for producing an electromagnetic field.

8. The three-dimensional imaging system according to claim 1, wherein the suspension force field generator comprises two suspension force field generating devices disposed at two opposite sides of the scattered particles.

9. The three-dimensional imaging system according to claim 1, further comprising:
    a barrier generator, generating a barrier around the display space to limit the scattering particles to move within the display space.

10. The three-dimensional imaging system according to claim 1, further comprising:
    a particle generator, generating the scattering particles and spraying the scattering particles to the display space.

11. A three-dimensional imaging method, adapted to a three-dimensional imaging system comprising a suspension force field generator, a projection module, and a controller, the three-dimensional imaging method comprising:

controlling the suspension force field generator to generate a suspension force field to suspend a plurality of scattering particles and distribute the scattering particles on a projection plane, wherein by changing the suspension force field, the projection plane where the scattering particles are distributed moves in a display space;

extracting a slice plane image that matches a position of the projection plane from a plurality of slice plane images sliced from a three-dimensional stereoscopic image according to positions of the slice plane images; and controlling the projection module to project the extracted slice plane image to the projection plane.

12. The three-dimensional imaging method according to claim 11, wherein the projection module comprises at least one projection device disposed around or in a center of the suspension force field generator or disposed on another side of the scattering particles relative to one side of the scattering particles where the suspension force field generator is located, and the three-dimensional imaging method further comprises:

controlling the at least one projection device by the controller to project or respectively project the image of at least one color to the projection plane or to a plurality of fixed sections of the projection plane.

13. The three-dimensional imaging method according to claim 11, wherein the three-dimensional imaging system further comprises a barrier generator, and the three-dimensional imaging method further comprises:

controlling the barrier generator by the controller to generate a barrier around the display space to limit the scattering particles to move within the display space.

14. The three-dimensional imaging method according to claim 11, wherein the scattering particles comprise one of or a combination of organic material particles, inorganic material particles, water molecules, magnetic particles, charged particles, plastic particles, and polymer material particles with a same polarity or different polarities.

15. The three-dimensional imaging method according to claim 11, wherein the scattering particles have a same polarity.

* * * * *